UNITED STATES PATENT OFFICE.

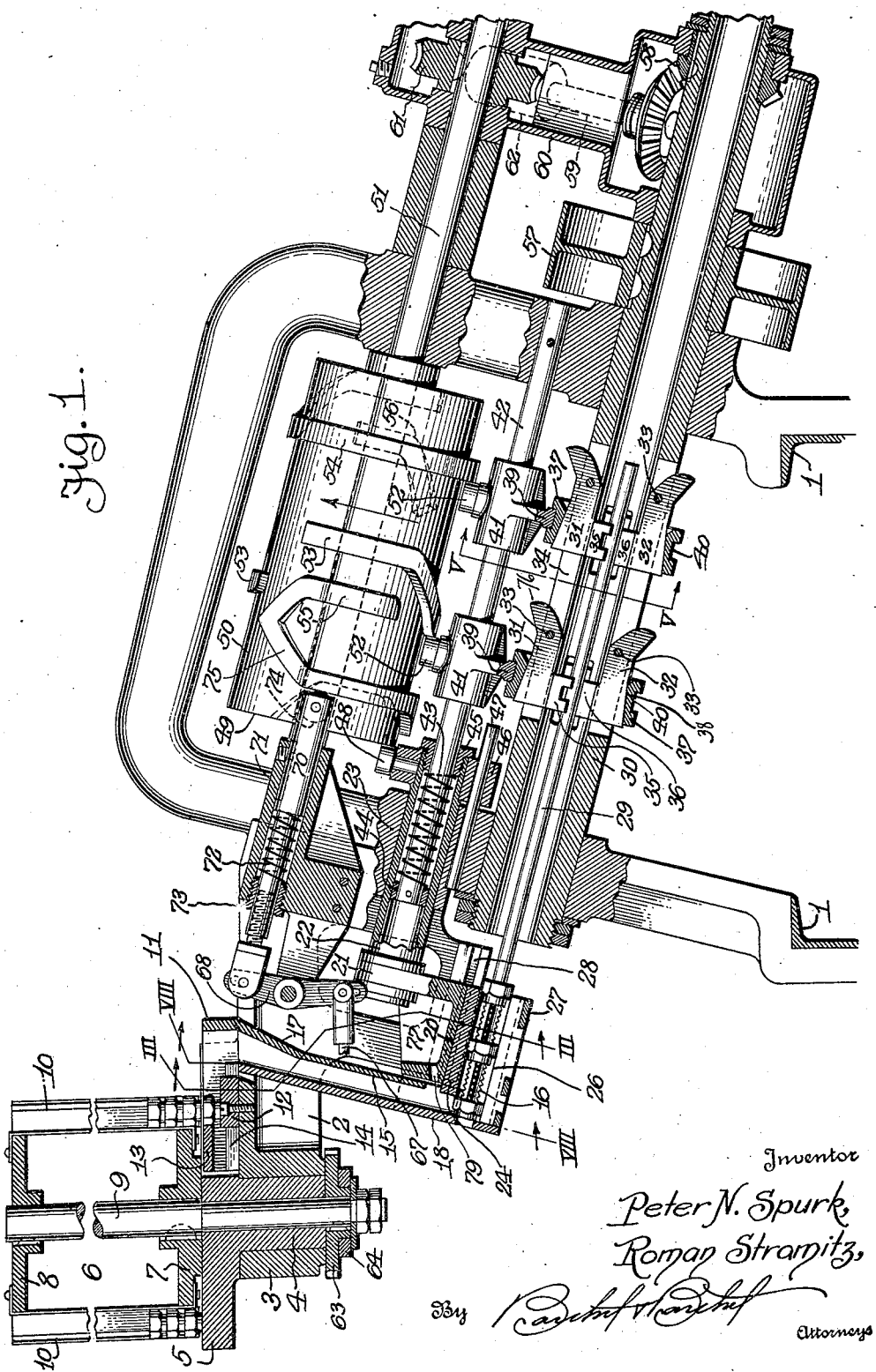

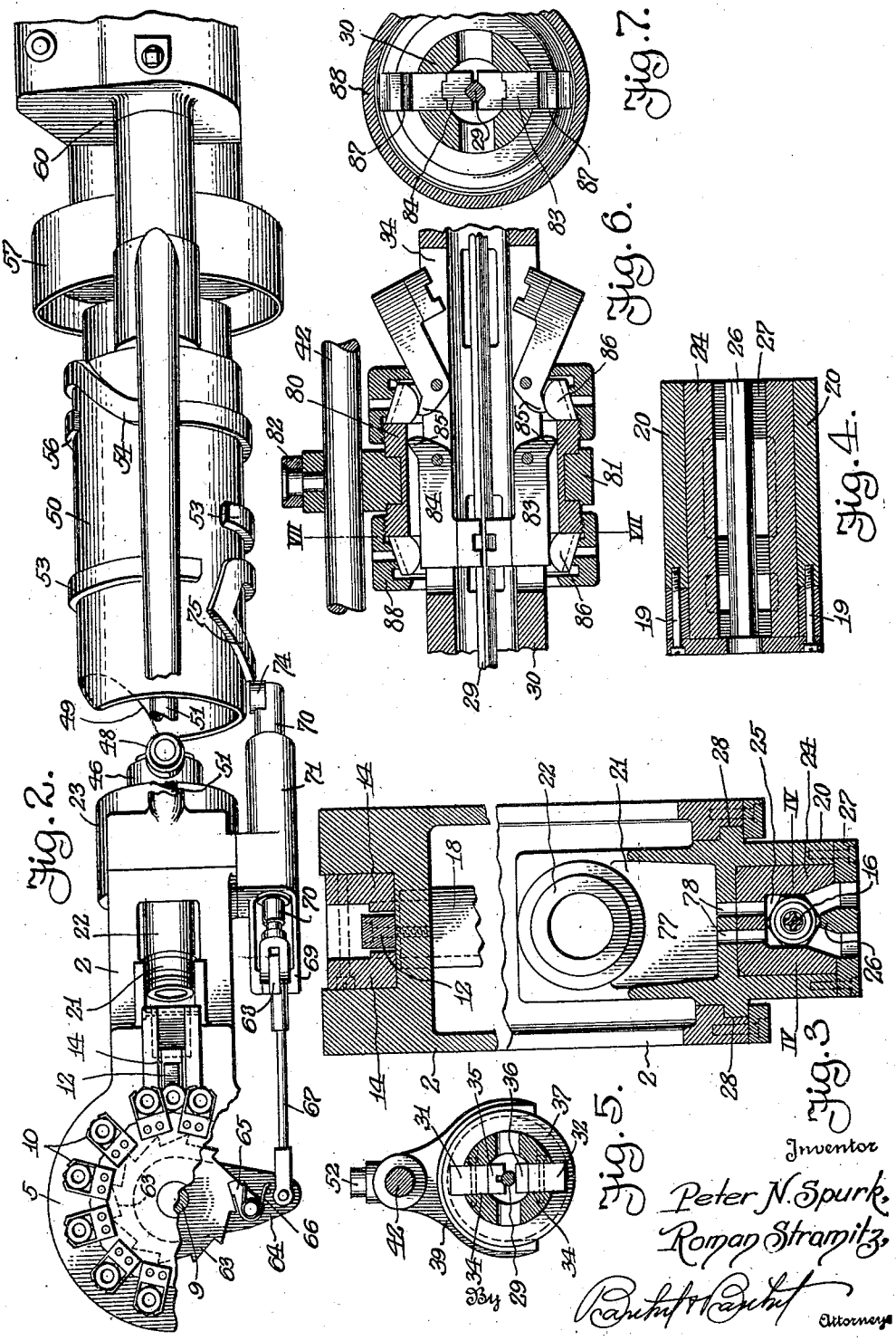

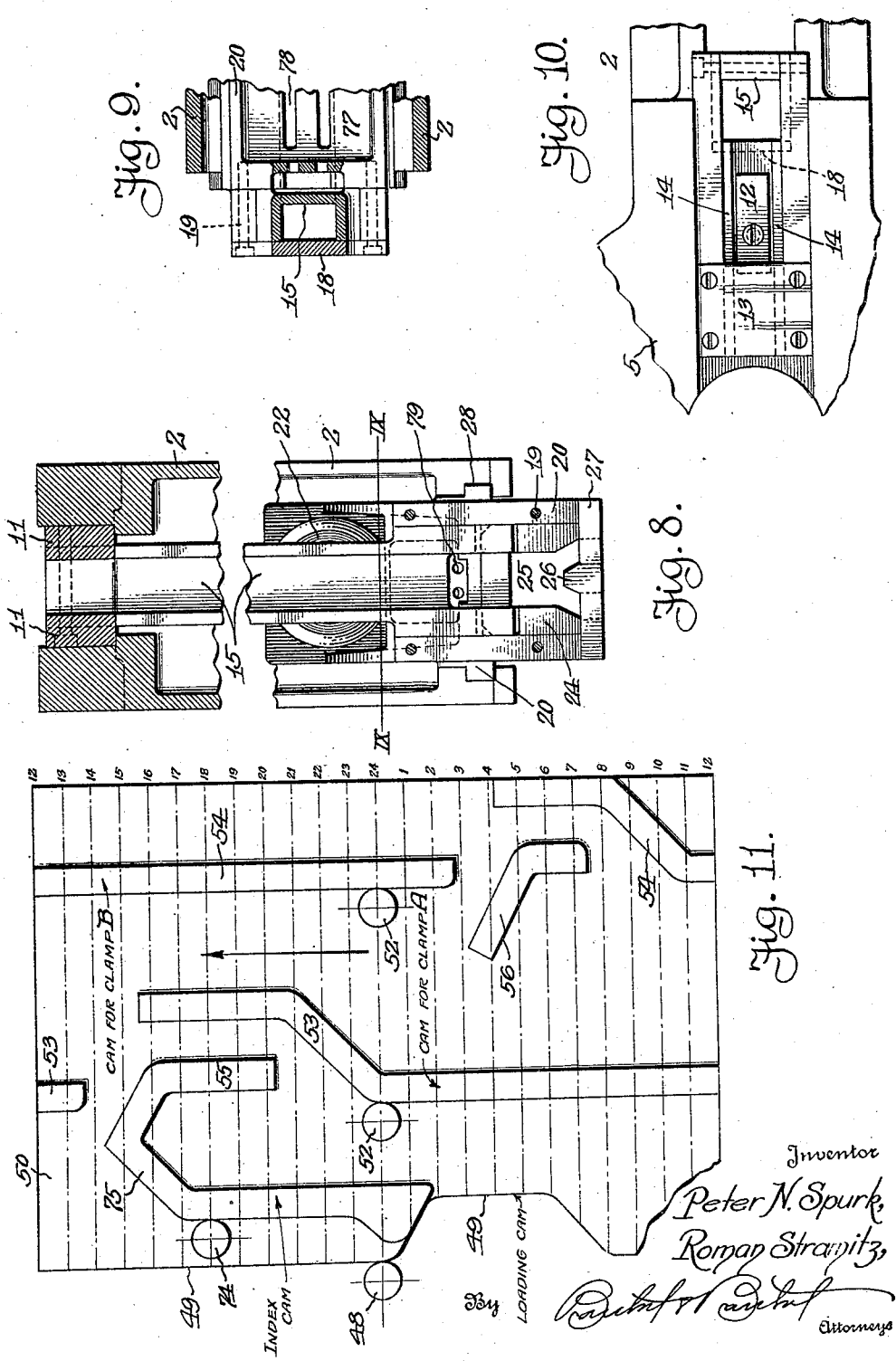

PETER N. SPURK AND ROMAN STRAMITZ, OF DETROIT, MICHIGAN.

NUT-TAPPING MACHINE.

1,416,135.  Specification of Letters Patent.  Patented May 16, 1922.

Application filed December 15, 1919. Serial No. 344,885.

*To all whom it may concern:*

Be it known that we, PETER N. SPURK, a citizen of the United States of America, and ROMAN STRAMITZ, a citizen of Austria, residing at Detroit, in the county of Wayne and State of Michigan, have invented certain new and useful Improvements in Nut-Tapping Machines, of which the following is a specification, reference being had thereto in the accompanying drawings.

This invention relates to nut tapping machines and more particularly automatic machines for tapping nut blanks.

The object of the invention is to provide a machine which will feed and tap nut blanks and discharge the finished nuts automatically and continuously, and further will perform the tapping operation and the release of the nuts without reversal of motion, change of speed or attention by the operator.

It is also an object of the invention to provide certain other new and useful features in the construction, arrangement and combination of parts all as hereinafter more fully described.

With the above and other ends in view, the invention consists in the matters hereinafter set forth and more particularly pointed out in the appended claims, reference being had to the accompanying drawings, in which—

Figure 1 is a substantially central longitudinal vertical section through a machine embodying the invention;

Fig. 2 a plan view of the same with parts broken away and in section;

Fig. 3 is an enlarged section substantially upon the line III—III of Fig. 1;

Fig. 4, a sectional detail substantially upon the line IV—IV of Fig. 3;

Fig. 5 a sectional detail substantially upon the line V—V of Fig. 1;

Fig. 6 a sectional detail showing a modified construction of gripping and releasing means;

Fig. 7 is a section of Fig. 6 on the line VII—VII thereof;

Fig. 8 is an enlarged sectional detail on the line VIII—VIII of Fig. 1;

Fig. 9 is a sectional detail substantially upon the line IX—IX of Fig. 8;

Fig. 10 is a detail view of the nut delivery mechanism in plan view; and

Fig. 11 is a diagrammatic or developed view of a master cam drum.

In the drawings, 1 indicates a suitable supporting frame which is formed at its forward end with a suitable bracket 2 providing a bearing 3 for a central hollow supporting member 4 on a table 5 which rests upon the bracket and provides a smooth upper surface forming a support for a rotatable nut blank carrier or hopper indicated as a whole at 6. This carrier comprises heads 7 and 8 which are fixed to a shaft 9 extending through the hollow member 4 of the table and rotatable therein. Secured to the peripheries of the heads 7 and 8 is a series of vertical chutes 10 formed to receive nut blanks at their upper ends and hold a series of nuts in superposed relation in each chute, the chutes being shaped to hold the nut blanks in proper angular relation to each other.

At one side the table is formed with a radial slot to receive a feed slide 11 and secured to the table within the slide is a block 12 so positioned that when the lower end of one of the chutes 10 is brought to position over the block by the turning of the carrier, that a nut blank will drop from the chute upon the block within the slide 11.

A pusher bar 13 extends across the slide 11 at the upper edge thereof in position to engage a face of the nut blank and, when the slide is moved rearwardly, will push the blank from the block, at the same time passing beneath the column of nut blanks in the chute and support said column. Upon the side walls of the slide 11 at the lower edges of said walls and at each side of the block 12 are ribs 14 which will catch and support the nut blank within the slide when the blank is pushed from the block 12 by the rearward sliding movement of the slide. Upon return or forward movement of the slide, the blank is prevented from being carried forwardly with the slide, by engagement of the blank with the block 12 and it is thus tilted and turned to a position where it will fall down a chute 15 provided therefor beneath the slide 11. The blanks are thus fed, one at a time, and dropped into the chute 15 where they fall to the bottom thereof and are held therein in position to be engaged by a tap 16. The rear wall 17 of the chute 15 is formed integral with the slide 11 and the front wall of this chute is in the form of a plate 18 which is secured by screws 19 (Fig. 4) to the sides of a carrier head 20 which has an upwardly extending arm 21 at its rear end to receive the forward end of a tubular shaft 22 mounted in a suitable bearing 23 on the frame. The carrying member or head 20 is formed with a longitudinal recess to receive a block 24 having a slot 25 therein of just sufficient width to allow a nut blank to pass therethrough, the lower end of the chute 15 opening into the forward end of this slot 25 to permit the nut blanks to fall down the chute into alignment with the forward end of the slot with one corner of the blank resting upon a longitudinal rib 26 formed upon a detachable bottom plate 27 secured to the bottom of the block 24 over the bottom of the slot, as clearly shown in Fig. 3. The carrying member 20 is thus supported by the forward end of the tubular shaft 22 which is free to slide longitudinally in its bearing 23 and this carrying member 20 is guided in its reciprocating movement within suitable guide ways 28 formed on the bracket 2 at the lower edge thereof. The front plate 18 of the chute 15 being attached to the carrier 20 and being in engagement with said walls of said chute, upon reciprocating movement of the member 20, the chute 15 and slide 11 will be reciprocated thereby to feed the nut blanks into the upper end of the chute.

The face of the table 5 is supported in a horizontal plane and the slide 11 reciprocates in a like plane but the tubular shaft 22 extends in a plane at an angle to the horizontal and carries the member 20 in a plane parallel therewith, the chute 15 extending upwardly at right angles to the inclined plane of the carrying member 20 and longitudinal plane of the axis of the shaft 22. The slide 11 and the carrying head or member 20 are thus reciprocated in planes which are in angular relation to each other and therefore to permit of such angular movement, the rear portion of the chute 15 is carried by and forms an integral part of the slide 11 while the plate 18 is carried by the head 20 and is free to move relatively to the other part of the chute.

The tap 16 is formed integral with a shaft or rod 29 and this rod is held in a manner hereinafter described against longitudinal movement and has a rotary motion imparted thereto. The tap is supported within the channel 25 of the block 24 in a position to engage the bore of each nut blank as it drops to the lower end of the chute 15 in position upon the supporting rib 26, and upon rearward movement of the carrying head 20, this tap will be engaged with the bore of the nut blank and by reason of the constant rotation of the tap will cut the desired internal thread on the blank, the blank being moved forwardly by the tap and guided in the channel 25 until it passes from the lower end of the tap onto the rod 29 which is integral with the tap. The tap rod 29 extends rearwardly into the forward open end of a tubular shaft 30, which is mounted in suitable bearings upon the frame 1 in a forwardly and downwardly inclined position and this rod is supported with its axis coincident with the axis of the shaft by means of clamping jaws arranged in pairs, these jaws 31 and 32 constituting each pair being pivotally mounted as at 33 within diametrically opposed slots 34 in the tubular shaft 30. The jaw 31 is provided with a head 35 having a V-shaped groove extending longitudinally thereof to engage one side of the rod and the other jaw 32 is provided with a head 36 having a plain face to engage the opposite side of the rod. The two pairs of jaws are spaced apart longitudinally of the rod and surrounding each pair of jaws is a clamping ring 37 having a tapered internal bore to engage the tapered outer edges 38 of the two jaws of each pair.

As shown in Fig. 1, the clamping rings 37 are moved forwardly to bring their internal tapered faces into contact with the tapered edges of the jaws and force said jaws to turn inwardly about their pivots and clamp the rod firmly between them. The clamping rings 37 are so moved by means of suitable yokes 39 engaging peripheral grooves 40 in the rings and these yokes are carried by heads 41 which are free to slide longitudinally upon a supporting rod or shaft 42 which is mounted at its forward end in a bearing in the frame and at its rear end within suitable bearings provided therefor within the tubular shaft 22. As before stated, the shaft 22 is free to move longitudinally in its bearing 23 on the frame and to resist this longitudinal movement in one direction, a coiled spring 43 is sleeved upon the rod 42 within this tubular shaft 22 between a collar 44 on one end of the shaft 42 and a suitable plug or closure 45 screw-threaded into the forward end of the tubular shaft. A collar 46 is secured upon the forward end of the tubular shaft 22 and has a transverse opening to receive a rod 47 secured to the frame. Upon longitudinal movement of the shaft 22, the collar slides freely therewith upon the rod 47 and said rod prevents rotation of the tubular shaft 22. This collar 46 also carries a roller 48 adapted to engage a cam face 49 upon the end of a master drum 50 which is mounted upon a shaft 51 in bearings on the frame 1, to turn with the shaft.

The heads 41 of the yokes 39 are also provided with rollers 52 to engage cam ribs 53 and 54 upon the surface of the drum 50. The cam rib 53 has an opposed cam rib portion 55 cooperating therewith, as will be hereinafter more fully described, and the cam rib 54 has a rib 56 cooperating therewith.

The tubular shaft 30 is positively driven by means of a pulley 57 secured thereto outside the frame 1 and adjacent the open lower end of this tubular shaft is a bevel gear 58 secured to the shaft in mesh with a bevel gear mounted upon a shaft 59 extending at right angles to the shaft 30 and upwardly through a suitable supporting casing 60 mounted upon the shaft 30 and upon the forward end of the drum shaft 51. Within this casing 60 upon the shaft 51 is secured a worm gear 61 in engagement with a worm 62 upon the shaft 59. The bevel gears, shaft 59, worm 62 and worm gear 61 are thus enclosed within a suitable casing which provides bearings for these parts and is supported upon the projecting ends of the shafts 30 and 51. Motion is transmitted from the shaft 30 to the shaft 51 through the medium of the bevel gears 58, shaft 59 and its worm gear connection with the shaft 51. The master cam drum 50 being secured to the shaft 51 is therefore rotated in timed relation to the rotation of the tubular shaft 30 and tap rod 29.

To impart an intermittent rotation to the hopper 6, a ratchet wheel 63 is secured to the lower end of the hopper shaft 9 and mounted upon the lower end of this shaft to rotate freely thereon, is an arm 64 (see Fig. 2) carrying a dog 65 to engage the ratchet 63. This dog is held in engagement with the ratchet by means of a suitable spring 66 and the arm 64 is given a reciprocating movement or partial rotation in each direction by means of a connecting rod 67 attached to the outer end thereof at one end and at its opposite end to a rocker bar 68 pivotally supported intermediate its ends upon a suitable bracket 69 carried by the frame. To the upper end of the rocker bar 68 is pivotally attached a plunger 70 mounted within a tubular bearing 71 on the bracket 69 to slide freely in a longitudinal direction therein. A spring 72 is sleeved upon the plunger within the tubular bearing between an enlarged end on the sleeve and a bearing plug 73 screwed into the rear end of the tubular bearing. The plunger 70 is thus moved in one direction by the spring 72 and to move the plunger in the opposite direction, a roller 74 is provided on the forward end of the plunger to engage a cam rib 75 on the drum 50.

The hopper 6 is thus given an intermittent step by step rotation to bring its several chutes 10 holding nut blanks, into position over the feed slide 11, and this step by step movement is performed in timed relation to the movements of the several other operating devices of the machine, by the rotation of the master cam drum 50 which also controls the movements of the slide 11 for feeding the nut blanks, one at a time, into the upper end of the chute 15 so that they will fall into position in front of the tap 16 at the proper time through the instrumentality of the cam face at the end 49 on the master cam drum 50, the roller 48 on the tubular shaft 22 passing into a cut-away portion of the cam surface 49 at the proper time relative to the movements of the plunger 70 for operating the hopper 6 and also relative to the opening and closing movements of the pairs of clamping jaws 35 and 36 caused by the cam ribs 53 and 54 which are also on the drum.

A nut blank having been fed into the chute 15 and having dropped to the bottom thereof into position in front of the tap 16, is held against rotation by the channel 25 of the block 24 within which it fits with its lower angle resting upon the rib 26 on the plate 27. A forward movement of the head 20 which is carried by the tubular shaft 22, then moves the nut blank into engagement with the end of the tap 16 which is continuously rotated with the tubular drive shaft 30 through the medium of the pairs of jaws 35 and 36. The tap being in rotation cuts the thread in the nut blank and at the same time moves the blank forwardly along the tap within the channel 25. Continued rotation of the tap feeds the nut onto the tap rod 29 where it is free to slide downwardly thereon in engagement with the first pair of clamping jaws. The portion 55 of the cam rib on the drum 50 then comes into engagement with the roller 52 and acts to move the yoke 39 longitudinally of its supporting shaft 42, thus moving the clamping ring 37 and releasing the first pair of clamping jaws, which jaws are each provided with an outwardly extending tail portion 76 adapted to be engaged by the ring, and cause the jaws to be tilted upon their pivots and thus opened outwardly a sufficient distance to permit the nut on the shaft 29 to slide downwardly thereon past these jaws. The nut thus released by the first pair of jaws slides down the rod into engagement with the second pair of jaws, when the cam rib 53 again operates to move the yoke 39 and cause the first pair of jaws to be closed into clamping engagement with the tap rod 29. After the first pair of jaws has been thus closed, the portion 56 of the cam rib on the drum 50 comes into engagement with the roller 52 of the yoke for operating the second pair of clamping jaws, and in a like manner these jaws are automatically opened, permitting the nut blank to pass between them down the rod 29 and from the end thereof into the tubular shaft 30, from the open lower end of which shaft it will be discharged. The opening and closing movements of the pairs of clamping jaws are performed in timed relation to the tapping operation so that preferably, as shown in Fig. 1, there will be a nut just passing from the tap as a blank comes into position for tapping and a third nut is midway of the tap within the guide channel 25. At this time both pairs of clamping jaws are in closed position and during the continuous operation of the machine there will be a nut on the tap rod 29 between the two pairs of jaws.

It will be noted that at no time are both pairs of jaws in open position and therefore the tap rod is rigidly held and driven by one or both pairs of jaws and the tap is always guided and supported by being in engagement with a nut thereon within the guide channel 25 of the block 24. The channel 25 is preferably formed within the detachable block 24 so that this block may be removed and another having a channel of a different width substituted therefor for nut blanks of a larger or smaller diameter. The carrying head 20 is also provided with an open oil pocket 77 in the upper side thereof and from said pocket channels 78 and 79 lead to the channel 25 and into the lower end of the chute 15 to provide a supply of oil to the tap.

In Figs. 6 and 7 a modified construction of the clamping device for the tap rod 29 is shown. In this construction the two pairs of clamping jaws are operated by a single sleeve member 80 which is moved longitudinally of the tubular shaft 30 by means of a single operating ring 81 which is provided with a roller 82 for engaging a suitable cam rib or ribs upon the drum 50. The jaws 83 and 84 comprising each pair are pivotally supported adjacent one end within the slots 34 in the shaft 30 and these jaws are formed with outwardly extending tail portions 85 to be engaged by suitable cam blocks 86 carried by the ring member 80 internally thereof and in a position to engage and slide upon the outer edges of the jaws. These cam blocks 86 are held within recesses 87 in rings 88 screw-threaded upon the ends of the sleeve 80 so that by turning the holding rings 88 relative to the ring 80, these blocks 86 may be adjusted.

As shown in Fig. 6, when the parts are in the position indicated, the first pair of clamping dogs is in clamping position for holding the tap rod and the other pair is held in open position to allow the finished nut to pass down the rod between the jaws, by the engagement of the blocks 86 with the tail portions 85 of this pair of the jaws. A short longitudinal movement of the sleeve 80 will close the second pair of jaws and in that position both pairs of jaws will be held in clamping position upon the rod by the engagement of the blocks 86 with the outer straight edges of the dogs of both pairs. A further longitudinal movement to the right will hold the two pair of dogs closed until the blocks 86 come into engagement with the tail portions 85 of the first pair which engagement will open the first pair of dogs or jaws to allow a nut to slide down the rod into the space between the two pairs. The pairs of jaws are therefore alternately opened and closed and at no time is the rod released by all of the jaws.

In this construction nut blanks are automatically fed to the tapping mechanism one at a time and are tapped and pass out of the machine automatically with a continuous uninterrupted operation without the necessity for reversing the rotation of the tap in order to release the finished nuts and without attention on the part of the operator. This construction does not necessitate a change of speed in order that the nut may be tapped and then unscrewed from the tap to release it but provides a construction in which the nut passes onto one end of the tap and is discharged from the other end thereof with a continuous even movement.

The machine is entirely automatic in its operation, it only being necessary to keep a supply of nut blanks within the chutes 10 of the hopper, there being a large number of these chutes from which the nut blanks are discharged, one at a time, so that an unskilled workman may keep a sufficient supply of blanks in the hopper to provide for the continuous operation of the machine.

Obviously, changes may be made in the construction and arrangement of parts within the scope of the appended claims without departing from the spirit of the invention, and we do not therefore limit ourselves to the particular form, arrangement or construction shown.

Having thus fully described our invention, what we claim is:—

1. In a machine of the character described, the combination of a movable head having a channel to receive and guide nut blanks, means for feeding nut blanks to said channel, a tap supported within said channel to engage the nut blanks, a rod forming a continuation of the tap, means for rigidly supporting and continuously rotating said rod including gripping members for gripping the rod, means for alternately operating the gripping members to cause first one and then the other to grip and then release the rod, and means for reciprocating the head in timed relation to the alternate operation of the gripping members to bring the nut blank into engagement with the tap.

2. In a machine of the character described, the combination of a reciprocable slide for feeding nut blanks, a rotatable carrier having a series of holders adapted to be brought one at a time into alignment with said slide to feed nut blanks thereto, a reciprocable head movable with the slide and provided with a channel to receive and guide the nut blanks, a chute carried by said head to receive nut blanks from said slide and deliver the same to said channel, a tap rotatably supported and non-reciprocable in the channel to engage and tap the nut blanks, means for rotating the tap including gripping members, means for reciprocating the slide and head, and means for automatically operating the gripping members in timed relation to the reciprocation of the slide and head.

3. In a machine of the character described, the combination of a horizontally disposed table, a hopper for nut blanks supported by the table, a reciprocable feed slide for feeding nut blanks one at a time from the hopper, a reciprocable head supported at an inclination to the horizontal plane of the table and slide and provided with a channel to receive and hold nut blanks, a chute connecting the slide and head to deliver nut blanks to the channel of the head, a tap supported within the channel to engage and tap the nut blanks, a rod to form a continuation of the tap, a tubular shaft in longitudinal alignment with the tap and into which the rod extends, gripping members arranged in pairs and pivotally attached to the tubular shaft to engage and grip the rod, means for operating each pair of gripping members in timed relation to the other pair, and means for reciprocating the slide and head in timed relation to the operation of the means for operating the gripping members.

4. In a machine of the character described, the combination of a reciprocable head adapted to receive and hold nut blanks, a tap supported in said channel to engage the nut blanks, a chute carried by the head and opening at its lower end into one end of the channel, a slide movable with the upper end of the chute, a table having a slot within which the slide is adapted to reciprocate nut blank feeding means comprising a rotatable carrier having a series of nut blank holding members adapted to be brought into position over the chute successively by the rotation of said carrier, means on the slide for engaging a nut blank and moving the same from beneath the carrier into the upper end of the chute, and means for reciprocating the head and slide and turning the nut carrier in timed relation to each other.

5. In a machine of the character described, means for feeding nut blanks comprising a table having a slot, a rotatable carrier having a series of vertically extending tubular members to receive and hold nut blanks in superposed position, said tubular holders being arranged to be brought, one at a time, with its lower end above the slot in the table, by the rotation of the carrier, a slide in the slot, means carried by the slide for pushing nut blanks, one at a time, from beneath a holder of the carrier, and means for rotating the carrier and reciprocating the slide in timed relation to each other.

6. In a machine of the character described, the combination of a reciprocable head formed with a nut receiving and guiding channel having walls to engage the faces of a nut blank and prevent rotation of the blank by passing longitudinally of the channel, a chute carried by the head and opening at its lower end into one end of the channel to feed nut blanks into the channel, a tap extending longitudinally in the channel of the head, said tap being rotatable and non-reciprocable, means for feeding nut blanks into the upper end of the chute, one at a time, means for rotating the tap including gripping members, and means for operating said gripping members, and means for operating the gripping members and reciprocating the head in timed relation, said head being also arranged to control the feeding of the nut blanks to the chute by the reciprocation of the head.

7. In a machine of the character described, the combination of a tubular shaft inclined in the direction of its length, means for rotating said shaft, a head reciprocable in a direction longitudinally of the shaft and having a nut receiving and holding channel arranged in longitudinal axial alignment with the shaft, a tap extending longitudinally of said channel, a rod forming an extension of said tap and support therefor, said rod extending longitudinally into the open forward end of the tubular shaft, gripping members carried by the shaft to grip and hold the rod, means for operating each of the gripping members, a rotatable member having cam ribs to operate said operating means for the gripping members in timed relation to each other, a cam surface on said rotatable cam member for reciprocating the head in timed relation to the operation of the gripping members, nut blank feeding mechanism, means for operating said feeding mechanism in timed relation to the reciprocation of the head and including a cam surface on said rotatable cam member, and means for rotating said rotatable cam member.

In testimony whereof we affix our signatures in presence of two witnesses.

PETER N. SPURK.
ROMAN STRAMITZ.

Witnesses:
ANNA M. DORR,
LEWIS E. FLANDERS.